United States Patent Office 3,513,759
Patented May 26, 1970

3,513,759
EXPOSURE METER ARRANGEMENT FOR SINGLE LENS REFLEX CAMERA HAVING DETACHABLE VIEWFINDER
Hidenobu Kondo, Tokyo, Japan, assignor to Nippon Kogaku K.K., Tokyo, Japan, a corporation of Japan
Filed June 19, 1968, Ser. No. 738,197
Claims priority, application Japan, June 23, 1967, 42/53,454
Int. Cl. G03b 19/12; G01j 1/16
U.S. Cl. 95—10                      6 Claims

ABSTRACT OF THE DISCLOSURE

A photometric system for a single lens reflex camera in which all of the exposure meter components are mounted within the camera body. The pentaprism viewfinder is so aranged as to permit the removal thereof from the camera body when the camera is not in use. The exposure meter circuit is provided with a switch which is actuated by the film advancing mechanism.

---

This invention relates to an exposure meter for a single lens reflex camera in which photometering is done through the lens.

In a single lens reflex camera, the viewfinder usually includes a pentaprism through which the scene to be photographed is viewed and through which the light rays are conducted to a photocell for providing an indication of the light value of the scene to be photographed. In conventional reflex cameras of this type, the exposure meter components such as a galvanometer, an electrical source, a photocell and possibly circuit elements constituting a computer are built into the viewfinder. The housing for the viewfinder and the exposure meter components becomes quite large and cumbersome, and in some instances the hand-held camera becomes quite top heavy.

The object of the present invention is to provide an exposure meter arrangement in which all of the exposure meter components are built within the camera body and the viewfinder so arranged that light rays pick up from the scene to be photographed is conducted into the camera body to impinge upon a photocell or cells within the body, the viewfinder being readily removable from the camera body when the camera is not in use.

In accordance with the present invention, the disposition of the exposure meter components within the camera body minimizes to a great degree the size of the viewfinder, the weight distribution of the camera as a whole being greatly improved so that the camera is well balanced and does not feel top heavy. In placing all of the exposure meter components within the camera body, all of the electrical connections are of a permanent nature with no disconnectable electrical connections between the exposure meter components and the removable viewfinder.

In carrying out the present invention, the pentaprism and eye piece are mounted in a removable enclosure which fits on the top of the camera body. The pentaprism is provided with a small prism or prisms, preferably on the rear surface thereof facing the eye piece, for directing photometering light rays downwardly into the camera body. Within the camera body are disposed a condensing lens and a focusing screen forming a part of the viewfinder. In addition, a second small condensing lens or lenses are mounted within the camera body in direct line with the small prism or prisms for directing the diverted light rays of the scene to be photographed onto the photo-sensitive surface of a photo cell or cells.

Figure 1:
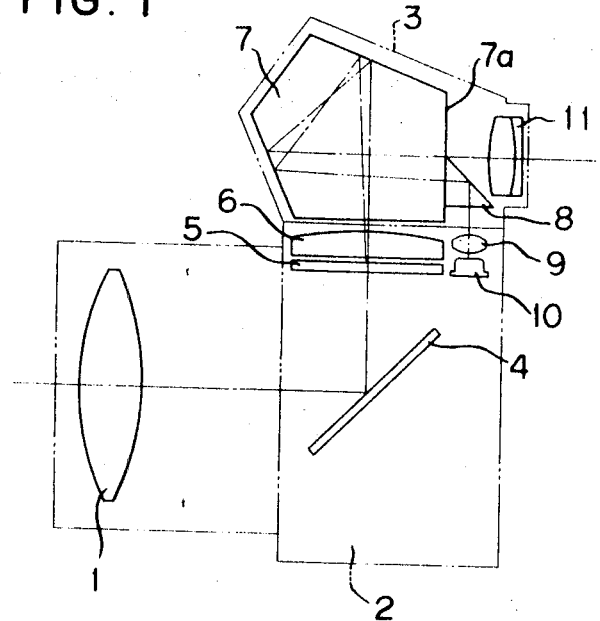
Figure 2:
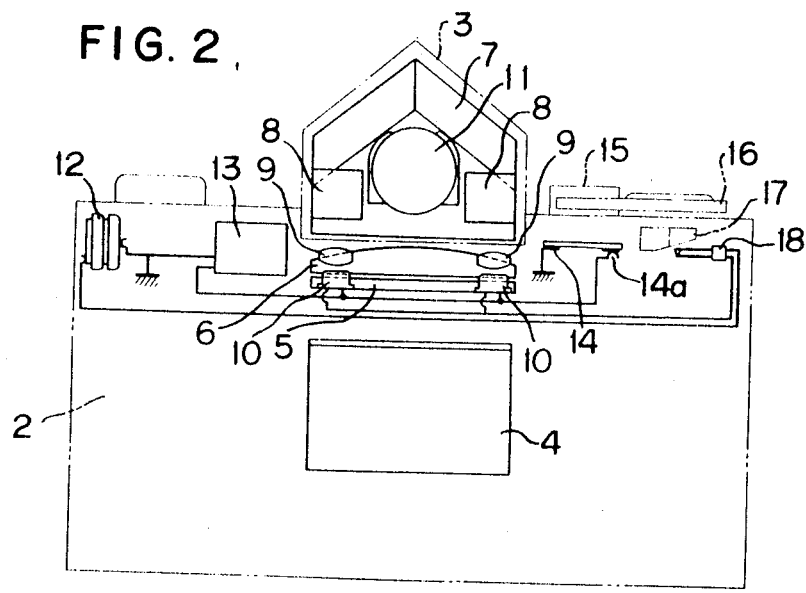

This invention will be more clearly understood by reference to an illustrative embodiment disclosed in the annex drawing, in which FIG. 1 is a schematic side view of an embodiment of the present invention, while FIG. 2 is a schematic and diagrammatic view as viewed from the rear of the camera of the lens arrangement and exposure meter circuit.

Referring now in detail to the drawing, an objective lens 1 is mounted in the usual manner on a camera body 2 shown in phantom lines. Within the camera body 2 is pivoted a reflecting mirror 4. Secured within the body is a focusing screen 5 and a condensing lens 6. Removably secured to the top of the camera body 2 is a disconnectable or removable viewfinder housing 3 enclosing a pentaprism 7.

Provided on the pentaprism 7 is a small prism 8, two small prisms being illustrated in FIG. 2. The prism or prisms are secured to the rear surface 7a of the pentaprism facing an eye piece 11 which is mounted on the viewfinder housing 3. In alignment with the prism or prisms 8 and secured within the camera body 2 are condensing lenses 9, and directly thereunder are photocells 10, preferably of the cadmium-sulfide type. Depending on whether one or two small prisms are used, should two photocells be used, the two cells are connected in parallel.

Referring in particular to FIG. 2 of the drawing, there is provided in addition to the photocells 10, a battery 12, a galvanometer 13, a variable resistor 14 which is interlocked with a shutter dial 15, and a normally open electrical switch 18 connected into a conventional exposure meter circuit. The setting of the shutter dial 15 will move the resistor slider 14a to vary the resistance value of the resistor. In connection with the switch 18, the switch is interlocked with the camera film advancing mechanism of the camera and shutter release (not shown), a film advancing lever 16 being shown in phantom line for operation of the film advancing mechanism and a cam 17 to close the switch, and upon returning of the lever 16 to its initial or in operative position, the cam 17 is returned in cooperation with the lever to open the switch 18 again.

From the foregoing description, it would be readily appreciated that the scene is viewed by the photographer through the eye piece 11, the objective lens 1 directing the light rays from the scene onto the mirror 4, the light rays then being deflected onto focusing screen 5 in the usual manner. A portion of the light rays is directed by the pentaprism 7 into the prism or prisms 8 thereby diverting the light rays through the condensing lens or lenses 9 onto the photo-sensitive surface of the photocell or cells 10.

Upon operation of the film advancing lever 16, the cam 17 is rotated to close the switch 18 thereby completing the electrical circuit through the galvanometer 13. The setting of the shutter dial 16 moves the sliding contact 14a of the variable resistance 14 to provide a proper exposure value for the scene to be photographed.

Upon returning of the lever 16 to its initial position or in operative position of the film advancing mechanism, the cam 17 is returned in cooperation with the lever to open the switch 18 again.

In addition to the variable resistance 14, it will be readily appreciated by those skilled in the art that computer components (not shown) can very readily be mounted within the camera body to provide for proper exposure and automatic operation. There is thus provided by the present invention an exposure meter arrangement in which the viewfinder enclosure is reduced in size and substantially in weight, in which the viewfinder housing is removable, all of the circuit components forming the exposure meter circuit being secured within the camera body.

What I claim is:
1. A photometric system for a single lens reflex camera, comprising
   a camera body,
   a viewfinder housing detachably secured to the camera body,
   a pentaprism secured within the housing,
   an eyepiece secured to the housing, the pentaprism and the eyepiece forming a part of the through-the-lens viewfinder for the camera,
   at least one small prism provided on the pentaprism surface and so arranged to reflect a portion of the light rays from the scene to be photographed downwardly into the camera body,
   at least one photocell secured within the camera body to receive the reflected light rays,
   a battery,
   a galvanometer, and
   circuit elements; the battery, galvanometer and circuit elements being secured within the body and electrically interconnected to form an exposure meter circuit.

2. A photometric system according to claim 1, wherein the small prism is provided on the pentaprism surface facing the eyepiece, the photocell being secured within the camera body adjacent the back thereof.

3. A photometric system according to claim 2, wherein two small prisms are provided, spaced apart on opposite sides of the eyepiece axis, two photocells being provided connected in parallel in the exposure meter circuit.

4. A photometric system according to claim 1, wherein the circuit elements include a variable resistance,
   a shutter dial for the camera, and
   means interlocking the shutter dial and the variable resistance for varying its ohmic value in accordance with the shutter dial setting.

5. A photometric system according to claim 1, wherein the circuit elements include a normally open switch,
   a film advancing lever forming a part of the film advancing mechanism of the camera, and
   a cam interlocked with the film advancing lever to close the switch when the film is advanced in the camera.

6. A photometric system according to claim 3, wherein the circuit making elements include a variable resistance and a normally open switch,
   a shutter dial for the camera,
   means interlocking the shutter dial and the variable resistance for varying its ohmic value in accordance with the shutter dial setting,
   a film advancing lever forming a part of the film advancing mechanism of the camera, and
   a cam interlocked with the film advancing lever to close the switch when the film is advanced in the camera.

References Cited

UNITED STATES PATENTS

| | | | |
|---|---|---|---|
| 2,933,991 | 4/1960 | Sauer | 95—42 XR |
| 3,315,581 | 4/1967 | Ruhle et al. | |
| 3,367,251 | 2/1968 | Furuta. | |
| 3,387,530 | 6/1968 | Ebertz | 95—42 XR |

FOREIGN PATENTS

| | | |
|---|---|---|
| 84,856 | 3/1965 | France. |

NORTON ANSHER, Primary Examiner

J. F. PETERS, JR., Assistant Examiner

U.S. Cl. X.R.

95—42